R. H. GRAHAM.
FEED BAG HOLDER.
APPLICATION FILED OCT. 29, 1913.
1,105,972.
Patented Aug. 4, 1914.
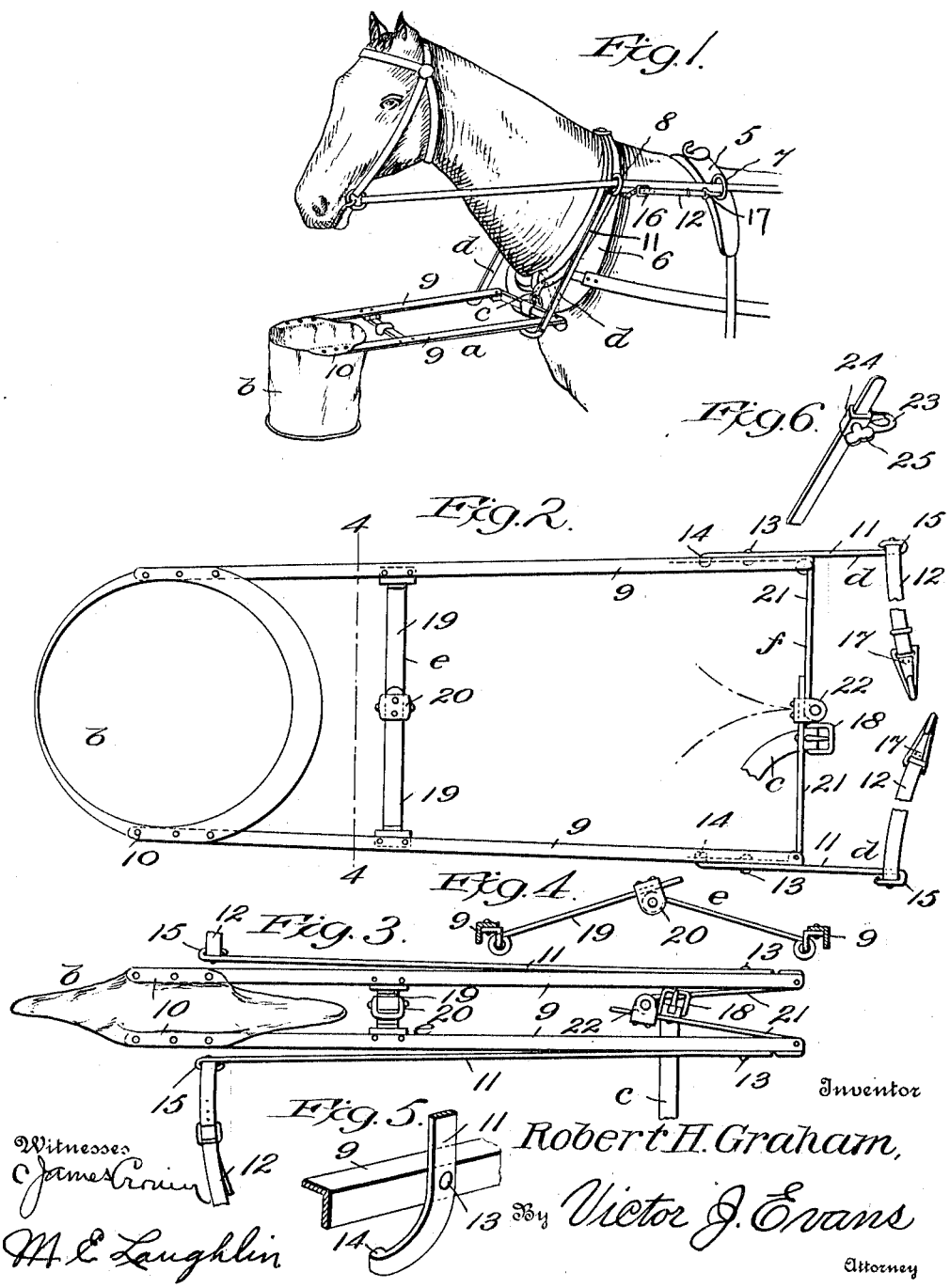

UNITED STATES PATENT OFFICE.

ROBERT H. GRAHAM, OF NEW YORK, N. Y.

FEED-BAG HOLDER.

1,105,972.  Specification of Letters Patent.  Patented Aug. 4, 1914.

Application filed October 29, 1913. Serial No. 798,075.

*To all whom it may concern:*

Be it known that I, ROBERT H. GRAHAM, a citizen of the United States, residing at New York city, in the county of New York and State of New York, have invented new and useful Improvements in Feed-Bag Holders, of which the following is a specification.

The general object of the invention is to admit of effecting the connection between a feed bag and an animal in such manner as will prevent the animal when moving its head or neck laterally or upwardly, from disturbing the position of the feed bag. And to this end the invention resides in a holder adapted for connection to such parts of the harness as remain immovable when the animal moves its neck or head.

Other objects will appear and be better understood from that embodiment of my invention of which the following is a specification, reference being had to the accompanying drawings forming part hereof, in which:—

Figure 1 is a perspective of the invention in use. Fig. 2 is a detail plan of the invention. Fig. 3 is a view similar to Fig. 2 showing invention folded. Fig. 4 is a vertical cross section on the line 4—4 of Fig. 2. Fig. 5 is a detail perspective of the structures which coöperate to hold the frame horizontally when the holder is connected to the harness. Fig. 6 is a modified form of support for use in connection with double harness.

In the drawings 5 indicates the saddle, 6 the collar 7 one of the saddle rings, and 8 one of the terret rings.

The holder forming the subject-matter of the present invention comprises a frame $a$ to the forward end of which the feed bag $b$ is connected, a tie in the form of a strap $c$ which connects the rear end of the frame to the collar 6, and hangers $d$—$d$ which are adapted for supporting the frame horizontally as shown in Fig. 1 and further adapted for connection to the terret rings 8 and the saddle rings 7. Obviously, with this construction and when the holder is connected to the animal as shown in Fig. 1, the bag $b$ will be held in such position as to readily admit of the animal having access to the feed contained therein but the bag will remain immovable when the animal elevates its head from the feeding position or otherwise moves its head or neck when in such elevated position with respect to the bag.

The frame $a$ comprises the side bars 9—9 which are preferably of metal and are herein shown as being right angular in cross section. The upper edge portion of the feed bag $b$ is outturned as indicated at 10, and riveted or otherwise fastened to corresponding end portions of the side bars 9—9. The cross bars $e$ and $f$ which connect the middle and inner end portions of the side bars 9—9, are preferably formed of flat pieces of metal. The length of each of these bars bears such relation to the diameter of the bag that the said bag will be fully extended when the cross bars occupy the positions shown in Figs. 1 and 2. The hangers $d$—$d$ comprise rigid sections 11—11 and flexible sections 12—12. The rigid sections 11—11 are preferably formed of metal and adjacent to their lower ends, as viewed in Fig. 1, are pivotally connected to the side bars 9—9 as indicated at 13. The lower end portions of the rigid sections are curved forwardly as viewed in Figs. 1 and 2 and the terminals of these curved portions are provided with stops in the form of inturned extensions 14—14. By virtue of the relative positions of the pivots 13 and the stops 14, the sections 11—11 will incline upwardly and rearwardly when the stops abut the side bars 9—9 and when the parts are positioned as shown in Figs. 1 and 2. When the said parts are positioned as last stated, the upper ends of the rigid sections 11—11 will extend approximately to the terret rings 8—8. These upper ends are provided with eyes 15—15 to which are connected one end of the flexible sections 12—12. These flexible sections 12—12 may be of any suitable material such as leather, and are adjustable in length by means of buckles, one of which is shown in Fig. 1 and indicated by 16. As shown in Fig. 1 the flexible sections 12 extend from the upper ends of the rigid sections 11 to the saddle rings 7 to which they are detachably connected by snap hooks 17—17, these snap hooks being connected to the free ends of the sections 12—12. Obviously with this construction and when the hangers are adjusted as shown in Figs. 1 and 2 and the snap hooks connected to the saddle rings 7, the holder will be suspended from the harness. The tie $c$ is herein shown as a flexible leather strap provided with a buckle 18. This strap is connected to a cross bar $f$ and is sufficiently long to permit its being wound around the base of the collar and secured by connecting the free end with the buckle. It is manifest that this strap when fastened as above indicated, will prevent lateral swaying of the holder as well as a possible raising of same by a forward and upward withdrawing of the animal's nose. As previously stated the sections 11—11 of the hangers are pivotally connected to the side bars 9—9 of the frame. Now by virtue of the curved lower end portions of the sections 11—11 the said sections may, when turned forwardly, be folded to a position parallel with the side bars 9—9 as shown in Fig. 3.

Referring now to Figs. 1 to 4 inclusive, the cross bars $e$ and $f$ are pivotally connected at their opposite ends to the side bars 9—9. It will be noted, however, that the pivots which connect the cross bar $e$ to the frame, are disposed at right angles to those which connect the cross bar $f$ to the frame and it will be further noted that the cross bar $e$ is made up of sections 19—19 whose inner ends are connected by a hinge 20 and also that the cross bar $f$ is made up of sections 21—21 whose inner ends are connected by a hinge 22. The pintles in the hinges 20 and 22 are disposed at right angles to each other and each pintle extends in a direction corresponding to the direction in which the pivots of the cross bar extend and of which cross bar the hinge forms a part. With this construction accidental folding of the feed bag support will be prevented while the support is in use, and the provision of the foldable cross bars $e$ and $f$ permits of the folding of the side bars 9—9 one upon the other.

In the modified form shown in Fig. 6 the flexible sections of the hangers are eliminated and substituted therefor are snap hooks one of which is shown in Fig. 6 and indicated by 23. These snap hooks are carried by slides one of which is shown in Fig. 6 and indicated by 24, such slide being adjustably secured to the rigid section of the hanger by a set screw 25. This modified form is intended for use with double harness where the saddle shown in Fig. 1 is not provided. In this connection it may be stated that where a support is provided for each animal the snap hook 23 on the hangers are connected to the terret rings or those carried by the hames (not shown).

What is claimed as new is:

1. A folding feed bag support, comprising a frame, foldable cross bars connected to the opposite sides of the frame and arranged to fold in directions at right angles to each other, and means for connecting the frame to the harness.

2. A foldable feed bag support, comprising a frame, a feed bag secured to one end portion of the frame, foldable cross bars connected to the opposite sides of the frame and arranged to fold at right angles to each other, hangers pivotally connected to the frame and adapted to be folded onto the frame, said hangers including rigid and flexible sections, the latter of which are adapted to be passed through the terret rings and to connect to the saddle rings of a harness.

In testimony whereof I affix my signature in presence of two witnesses.

ROBERT H. GRAHAM.

Witnesses:
M. E. LAUGHLIN,
GEO. A. BYRNE.